US007761418B2

(12) United States Patent
Brown et al.

(10) Patent No.: US 7,761,418 B2
(45) Date of Patent: Jul. 20, 2010

(54) METHOD AND PRODUCT FOR SHARING LOGGED DATA OBJECTS WITHIN A DISTRIBUTED STORAGE SYSTEM

(75) Inventors: Richard Brown, Bristol (GB); Keith Alexander Harrison, Woodcroft Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1327 days.

(21) Appl. No.: 10/848,570

(22) Filed: May 19, 2004

(65) Prior Publication Data

US 2004/0267696 A1 Dec. 30, 2004

(30) Foreign Application Priority Data

May 23, 2003 (GB) .................................. 0311874.2

(51) Int. Cl.
G06F 17/30 (2006.01)
(52) U.S. Cl. .................... 707/622; 707/609; 707/617
(58) Field of Classification Search .................. 707/100
See application file for complete search history.

(56) References Cited

U.S. PATENT DOCUMENTS

| 6,233,684 | B1 * | 5/2001 | Stefik et al. ................. 713/176 |
| 6,389,538 | B1 | 5/2002 | Gruse et al. ................. 713/194 |
| 2003/0050834 | A1 * | 3/2003 | Caplan ........................ 705/14 |
| 2003/0125964 | A1 * | 7/2003 | Chang et al. ................... 705/1 |
| 2003/0195861 | A1 * | 10/2003 | McClure et al. ................ 707/1 |

FOREIGN PATENT DOCUMENTS

WO    WO 03/060908    7/2003

OTHER PUBLICATIONS

Park et al., Access Control Management and Models: Towards Usage Control Models: Beyond Traditional Access Control, Jun. 2002, Proceedings of the Seventh ACM Symposium on Access Control Models and Technologies, p. 60.*
Stevens, Richard, "TCP/IP Illustrated, vol. 1: The Protocols", 1994, Addison-Wesley, p. 297.*
Rackmount.com, "Rack Mounted Server Cserver 1180/1125", Sep. 24, 2002, PCW Microsystems, p. 1-5.*
Androutsellis-Theotokis, et al., "A Survey of Peer-to-Peer Content Distribution Technologies", Dec. 2004, ACM Computing Surveys, p. 335-371.*
Gnutella Development Forum. The Gnutella Protocol, 2002, http://web.archive.org/web/20020221133753/http://groups.yahoo.com/group/the_gdf/messages.*
SetiAtHome 2003. The seti@home project web site: http://web.archive.org/web/20030201165803/http://setiathome.ssl.berkeley.edu/.*
Napster, Apr. 2, 2003, http://web.archive.org/web/20030402015635/http://www.napster.com/.*
Kazaa, Jan. 2003, http://web.archive.org/web/20021203014305/kazaa.com/us/index.php.*

(Continued)

Primary Examiner—Khanh B Pham

(57) ABSTRACT

A distributed data processing system includes individual data processing units that automatically communicate with a centralised data management unit in response to information objects being received or accessed by the data processing units. Data associated with information objects is communicated to the data management unit, thereby facilitating the automatic management of the information objects within the system.

19 Claims, 6 Drawing Sheets

OTHER PUBLICATIONS

Waldman, A. et al., "Publius: A robust, tamper-evident, censorship-resistant web publishing system.", 2000, Proceedings of the Nineth USENIX Security Symposium.*

Groove 2003. http://web.archive.org/web/20030411204808/www.groove.net/.*

Skype.com, Oct. 2003, http://web.archive.org/web/20031005/www.skype.com/.*

Rackmount.com, "Rack mount Chassis Product Guide", Aug. 2003, http://web.archive.org/web/20030806032749/http://rackmount.com/Chassis.htm.*

MojoNation, The MojoNation web site, 2003, http://web.archive.org/web/20030420175017/http://www.mojonation.net/index.html.*

Kubiatowicz et al., "Oceanstore: An architecture for global-scale persistent storage", 2000, Proceedings of ACM ASPLOS.*

James, Official Netscape Communicator 4 Book, Dec. 1997, Ventana, Windows Edition, p. xxiii, 3-5, 13, 16, 17, 33-35, 82, 90, 117, 123-131, 154-155, 371, 373-377, 379-382, 520, 530, 562, 569, 680, 684, 800-803.*

* cited by examiner

METHOD AND PRODUCT FOR SHARING LOGGED DATA OBJECTS WITHIN A DISTRIBUTED STORAGE SYSTEM

TECHNICAL FIELD

The present invention relates to a data management method and data processing unit.

BACKGROUND ART

It is common place for data processing systems to be formed from a number of individual data processing units being able to communicate with one another. An example of a suitable data processing unit is a personal computer, or alternatively a work station. The individual personal computers may be similar in processing capacity and data storage to one another and may be physically located at a single site, for example within the offices of a company. In this example, the communications between each personal computer may be in the form of a wired network using dedicated network communication cables. Equally, one or more of the personal computers may be dedicated data storage units arranged to provide the majority of the data storage facilities for the company.

A further example may be individual personal computers located at geographically disparate locations, for example at individual residences, and having the ability to communicate to one another via a public network, such as the Internet.

There are various ways in which the data processing units may be arranged to operate in order for the data processing system to function. For example, a single data processing unit may be arranged to centrally manage the various tasks of the entire system, with the remaining data processing units arranged to defer such system management functions to the single designated data processing unit. Alternatively, the various system management functions may be distributed across the entire data processing system. In this latter case, at least a number of data processing units are capable of performing one or more system management functions, either individually or by co-operating with other data processing units. As there is little or no hierarchical structure in data processing systems of this kind, they are often referred to as "Peer-to-Peer" networks. It is a common feature of peer-to-peer networks that communication between individual data processing units (peers) is direct, by which it is meant in this context that the communication is not directed, or brokered, via a further managing data processor. However, it will be appreciated that such direct communication may involve the use of one or more intermediate data processing units acting purely to relay on the communication where no physical direct communication link is available. It is to Peer-to-Peer networks that embodiments of the present invention are particularly directed to.

In peer-to-peer networks and other similar distributed data storage systems, the management of data stored at various locations across the data processing systems can be problematic. Particularly in the latter example of a shared public data processing system, it can be difficult to compile and maintain an accurate record of what information is stored at any given location within the system.

One known technique intended to address this disadvantage is to provide the data processing system with an index. The index is intended to maintain a directory of the information present within the data processing system. For example, the index may comprise a list of individual data items together with the identity or location of individual data processing units at which the data item is located. In systems utilising such an index, the individual users of the data processing units may look up a particular data item in the index to establish its location and, if required, subsequently retrieve the data item, or a copy thereof, from the location indicated by the index. The disadvantage with this known system is that there is a reliance on individual data processing unit users to inform, or update, the index of changes relating to data items located at that particular data processing unit as there is no mechanism provided for automatically doing so. For example, should the user of a data processing unit decide to delete a particular data item from that data processing unit, it is reliant upon that user to inform or update the index accordingly. Whilst this may work reasonably well when the data processing system in question is a corporate, or company owned, system, it is less likely to be reliable when the data processing system is a publicly shared one. In the latter case, there is an absence of corporate pressure on users to maintain the index. This leads to the strong possibility that data items are deleted, added or copied by individual users without the index being modified. Equally, data may be accidentally or deliberately replicated. The index is therefore not a reliable source of information about any one data item and, in particular, there is a significant risk that all copies of any given data item may be deleted from the data processing system before this fact, or the reduction in numbers of copies, is reflected in the index. This is clearly a significant disadvantage if the data processing system is to be used with valued data items.

Conversely, the distributed nature of the data on the data processing system, can result in difficulties in managing old or infrequently used data items. Subsequently, a larger number of copies of a data item may be maintained across the data processing system than is necessary considering the age or frequency of use of the data item, whereas it may be more efficient to simply delete data items that are older than a certain age or are infrequently accessed.

SUMMARY OF THE INVENTION

According to a first aspect of the present invention there is a method of managing data within a distributed data storage system, the distributed data storage system comprising a plurality of data processing units, at least one of the data processing units having a data object stored thereon, the data object including a data unit and an executable code unit, the executable code unit being arranged to automatically cause a data processor at which the data object is received to execute the code unit, the method comprising, in response to receiving a data object at a first one of the data processing units, automatically executing the executable code unit by the first data processing unit, execution of the code unit causing the first data processing unit to send data associated with the data object to a second data processing unit at which a data log is stored, the associated data identifying the received data object and the first data processing unit, and updating the data log in response to receiving the associated data.

It is therefore possible to provide a data management system in which data processing units automatically communicate data associated with a data item in response to receiving the data item such that the information held by the data log about the data objects is always up to date. As a consequence the process is transparent to a user. Examples of data objects include sound and video clips, pictures and executable programs such as games.

The data associated with a data object may be sent to the second data processing unit by the first data processing unit in response to the data object being accessed by the first data processing unit. Similarly, the associated data may additionally or alternatively be sent to the second data processing unit by the first data processing unit in response to the first data processing unit deleting the data object.

Any data processing units are thus automatically triggered to communicate the data associated with a data object in response to one or more predetermined events occurring in respect of that data object. Therefore, any time the data object is propagated to a data processing unit, or accessed by that data processing unit for any given purpose, the data processing unit at which the data log is stored is notified. There is therefore no reliance on the users of the data processing units to provide this information voluntarily.

The executable code unit may be also be arranged to cause the data processing unit to send the associated data in response to varying trigger actions, depending upon the nature of the data object and/or the data processing unit. Examples of such trigger actions may include installing or deleting a data object from the system, or playing an object such as an audio or video file.

The data log preferably comprises at least one of the total number of copies of the data object to which the data is associated stored within the distributed data storage system, the elapsed time since the associated data was last sent to the second data processing unit, the duration of each occurrence when the data object was accessed by a data processing unit and the number of times that the data object has been accessed by a data processing unit.

Additionally or alternatively, in response to the data log conforming to one or more criteria, the second data processing unit may send a control signal to the first data processing unit, whereby the control signal is arranged to cause the first data processing unit to send the data object to at least one further data processing unit within the distributed data storage system.

The criteria may comprise a number of copies of a data object being less than a predetermined value. It is therefore possible to provide a data storage system that monitors a number of copies of any given data object held within the system by monitoring the data log, and if the number of copies falls below a preset number, causing at least one of the data processing units at which a remaining copy of the data object is held to communicate that data object to a designated data processing unit. Consequently, the designated data processing unit is arranged to act as a safe repository for objects that it would be undesirable to be completely deleted from the data storage system.

Additionally or alternatively, the criteria may comprise the frequency of a data object being accessed by a data processing unit being less than a predetermined value. Consequently it is also possible to provide a data storage system that transfers data objects that are infrequently accessed to a designated data processing unit.

A status request may be sent from the second data processing unit to the first data processing unit and, if no reply is received, the second data processing unit be arranged to update the data log.

Attempts may therefore be made periodically or from time to time to verify the accuracy of the data log by attempting to communicate with the data processing units indicated as being the location of any given data object. The failure to establish communication with one of the indicated data processing units may be interpreted as meaning that the data processing unit is no longer part of the data storage system and the data log is correspondingly amended. Should the data processing unit subsequently communicate to the data management unit associated with an information object, the data log will be correspondingly reamended.

The second data processing unit may be arranged to generate billing data associated with a data object in response to receiving the associated data from the first data processing unit.

Therefore, if the data object comprises media data, such as an audio file, it is possible to accurately and reliably generate data relating to royalty or licence payments, for example.

According to a second aspect of the present invention there is provided a computer program product comprising a plurality of computer readable instructions that when executed by a computer within a distributed data storage system cause that computer to perform the method of the first aspect of the present invention.

Preferably the computer program product is embodied on a program carrier.

Advantageously, each of the data processing units within the distributed data storage system is arranged to perform one or more management functions of the distributed data storage system. Preferably, the distributed data storage system comprises a peer-to-peer network.

According to a third aspect of the present invention there is provided a data processing unit comprising communicating means for communicating to at least one further data processing unit, the data processing unit being arranged in response to receiving a data object including a data object and an executable code unit, to automatically execute the code unit, the code unit causing the data processing unit to send data associated with the data object to the further data processing unit, the associated data identifying the received data object and the data processing unit at which it was received.

Additionally, the data processing unit may be arranged to execute the program code unit in response to either receiving, accessing or deleting the data object.

BRIEF DESCRIPTION OF THE DRAWINGS

Embodiments of the present invention will now be described, by way of illustrative example only, with reference to the accompanying figures, of which.

DETAILED DESCRIPTION OF THE DRAWINGS

Figure 1:
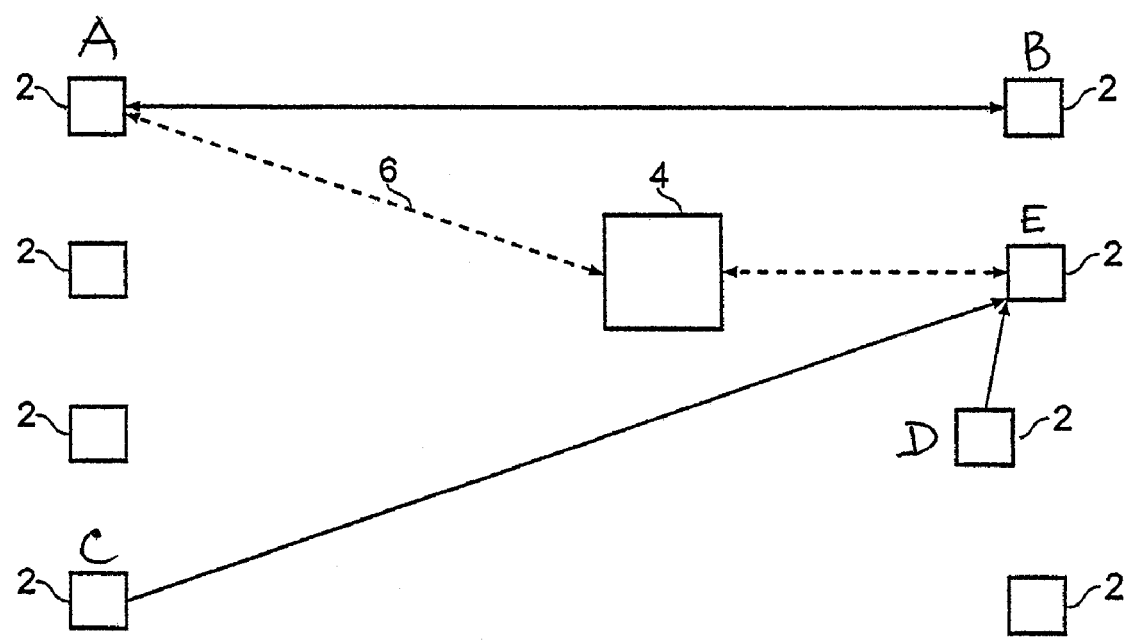
FIG. 1 is a schematic illustration of a distributed data processing system according to the prior art.

FIG. 1 schematically illustrates a data processing system according to the prior art. The data processing system includes a plurality of data processing units 2. Each data processing unit 2 includes a communications device (not shown) that allows the data processing unit to communicate with at least one other of the data processing units 2. In the case where the data processing units 2 are workstations or desktop computers forming part of a company network the communications devices may be an appropriate network card. Also included in the data processing system is an index unit 4. The index unit 4 may comprise a further desktop computer and is arranged to store an index of the information objects held at each of the data processing units 2. The index unit 4 also includes a communications device (not shown) to allow the index unit to communicate with each of the data processing units 2. FIG. 1 illustrates how information objects are communicated between data processing units 2 in such prior art data processing systems. Suppose that a first data processing unit 2, labelled A, desires a particular information object. Data processing unit A communicates a request to the index unit 4 querying the location of the information object within the data processing system. If it is not already known that the information object is held within the data processing system, the query may also determine the availability of the requested information object. Assuming the information object is available, its location, in terms of the data processing unit 2 at which it is held, is communicated back to the requesting data processing unit, labelled A. This bi-directional communication is represented by the broken arrow 6 shown between the data processing unit 2 and index unit 4. The original data processing unit 2, labelled A, then requests retrieval of the information object from the data processing unit 2, in this instance labelled B, at which the information object is held. The information object is thus communicated to the original data processing unit 2, labelled A. Alternatively, the index unit 4 may communicate a command to the data processing unit, labelled B, at which the information object is located to command the data processing unit labelled B to communicate the information object to the original requesting data processing unit, labelled A.

Also illustrated in FIG. 1 is the situation where multiple copies of an information object is held at different data processing units. In the example shown, an information object is held at the data processing units labelled C and D. Data processing unit E queries the index unit 4 as previously described to determine that the requested information object is stored at both data processing units C and D. Depending upon the configuration of the data processing units 2, the data processing unit labelled E may then determine which of the two data processing units C and D at which the required information object is held is the most appropriate to retrieve the information object from.

In neither of the situations illustrated in FIG. 1 is the index unit 4 automatically updated. This only occurs if the user of the requesting data processing unit takes positive action to update the index unit 4. Consequently, there is no guarantee that the information held at the index unit 4 is accurate.

Figure 2:
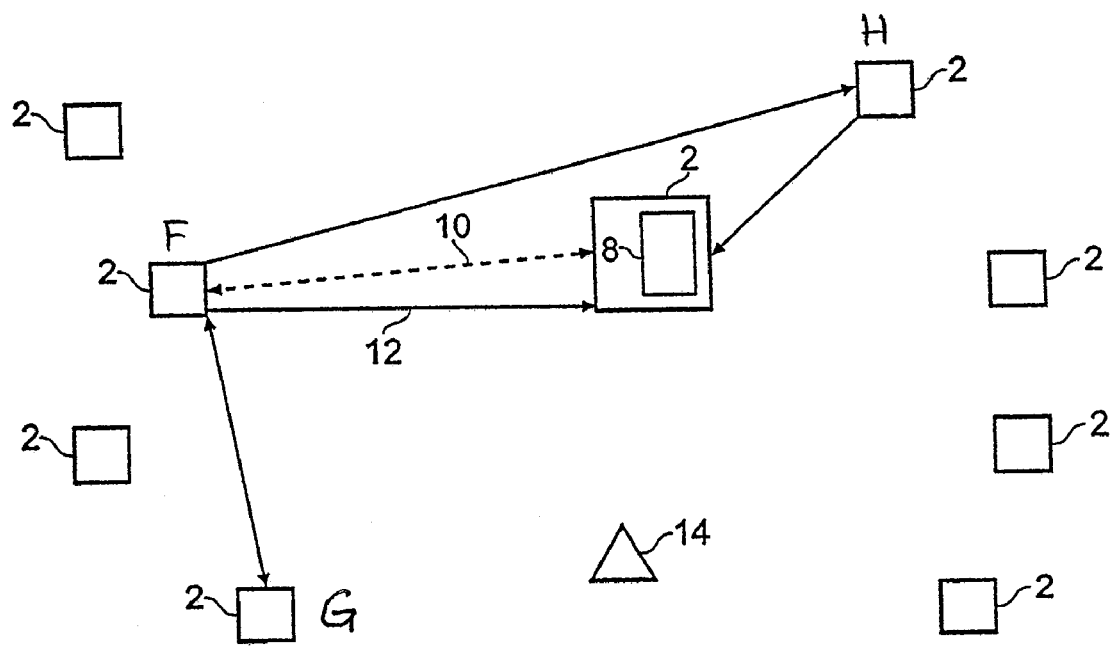
FIG. 2 is a schematic illustration of a data management system according to an embodiment of the present invention.

A data processing system according to an embodiment of the present invention is schematically illustrated in FIG. 2. As in FIG. 1, the data processing system includes a number of data processing units 2 that are equipped to establish communication with one another as required. An example of an appropriate processing system is a peer-to-peer network. Stored at one end of the data processing units is a data log 8. As described above in relation to FIG. 1, one of the data processing units 2, labelled F, may communicate with the data processing unit 2 at which the data log 8 is stored to establish the location of a particular information object. This is represented in FIG. 2 by the broken arrow 10. The desired information object is then retrieved from the data processing unit 2 at which it is located, in the example shown the data processing unit labelled G. However, in embodiments of the present invention, the data processing unit that has now acquired the information object, that labelled F, now automatically communicates this fact to the data processing unit at which the data log is stored, represented in FIG. 2 by the solid arrow 12. The data log 8 is therefore able to maintain more accurate information considering the information objects located at each of the data processing units 2 within the system. Equally, should the data processing unit labelled F communicate an information object directly to one of the further data processing units 2, labelled H in FIG. 2, that further data processing unit also communicates this occurrence to the log 8. In both cases, the data processing unit 2 at which the data log 8 is stored may be arranged to update the data log. The communication of the data concerning information items located at respective data processing units therefore occurs automatically.

The data processing units 2 may be arranged to communicate information associated with an information object at times other than just when the information object is first received by a data processing unit. For example, data associated with an information object may be communicated to the data log whenever that information object is accessed by a data processing unit. Such an access may include communicating the information object to a further data processing unit such that the information object is either copied or moved to the subsequent data processing unit. Data associated with an information object may also be communicated to the data log 8 prior to the information object being deleted from a data processing unit 2. The type of data associated with an information object that may be transmitted to the data log 8 includes data identifying the information object to which it is associated, data identifying the data processing unit at which the information object is located, data identifying the frequency and duration with which the information object is accessed by a data processing unit and information identifying subsequent data processing units to which the information object is either moved or copied.

The automatic acquisition of such information by the data log permits the enhanced management of the information objects within the data processing system. For example, by recording the number of times and duration that an information object is accessed by data processing unit it is possible to charge the identified user, or keeper, of that data processing unit for the use of the information object. One such application of this would be if the information object is an audio or video file, such that a user may be charged a fee for each time the audio file is accessed or listened to. Alternatively, the information object may be a resource within the data processing system, such as a particular processing application, the use of which it is desirable to charge users for.

The data log 8 may store one or more predefined criteria relating to the information objects held within the data processing system. For example, a criteria may be that for any given information object there should be no less than a predetermined minimum number of copies of the information object distributed throughout the data processing system. By comparing the data held in the data log 8 with this criteria, the data processing unit may be used to control the other data processing units 2 such that the minimum number of copies of an information object are always present. For example, the data processing unit may issue a control signal to a further data processing unit 2 at which a particular information object is located such that the further data processing unit 2, in response to the control signal, communicates a further copy of the information object to at least one other of the data processing units 2, thereby increasing the total number of copies of that information object within a data processing system. Equally, the data log 8 may be used to determine those information objects that are infrequently accessed, or are greater than a certain age. Control signals may be generated so as to control the appropriate data processing units 2 to communicate those particular information objects to a designated further data processing unit 14, as shown in FIG. 2. This further data processing unit 14 therefore acts as a repository for information objects, either to ensure at least one copy of the information object is retained within the data processing system, or to act as a temporary storage site for aged information objects before those information objects are permanently deleted from the data processing system.

A further function that may be facilitated by the data log 8 in embodiments of the present invention is to improve the accuracy of data stored in the data log 8. Periodical attempts may be made to establish communication with a data processing unit 2 at which an information object is located according to the information held within the data log 8. Failure to establish communication with the identified data processing unit 2, prompts amendment of the relevant entry in the data log to reflect that a data processing unit is no longer available. Consequently, the number and identity of data processing units 2 making up the data processing system may vary without rendering the information held by the data log completely unreliable. This is of particular benefit when the data processing system comprises a publicly shared network or other peer-to-peer.

Figure 3:
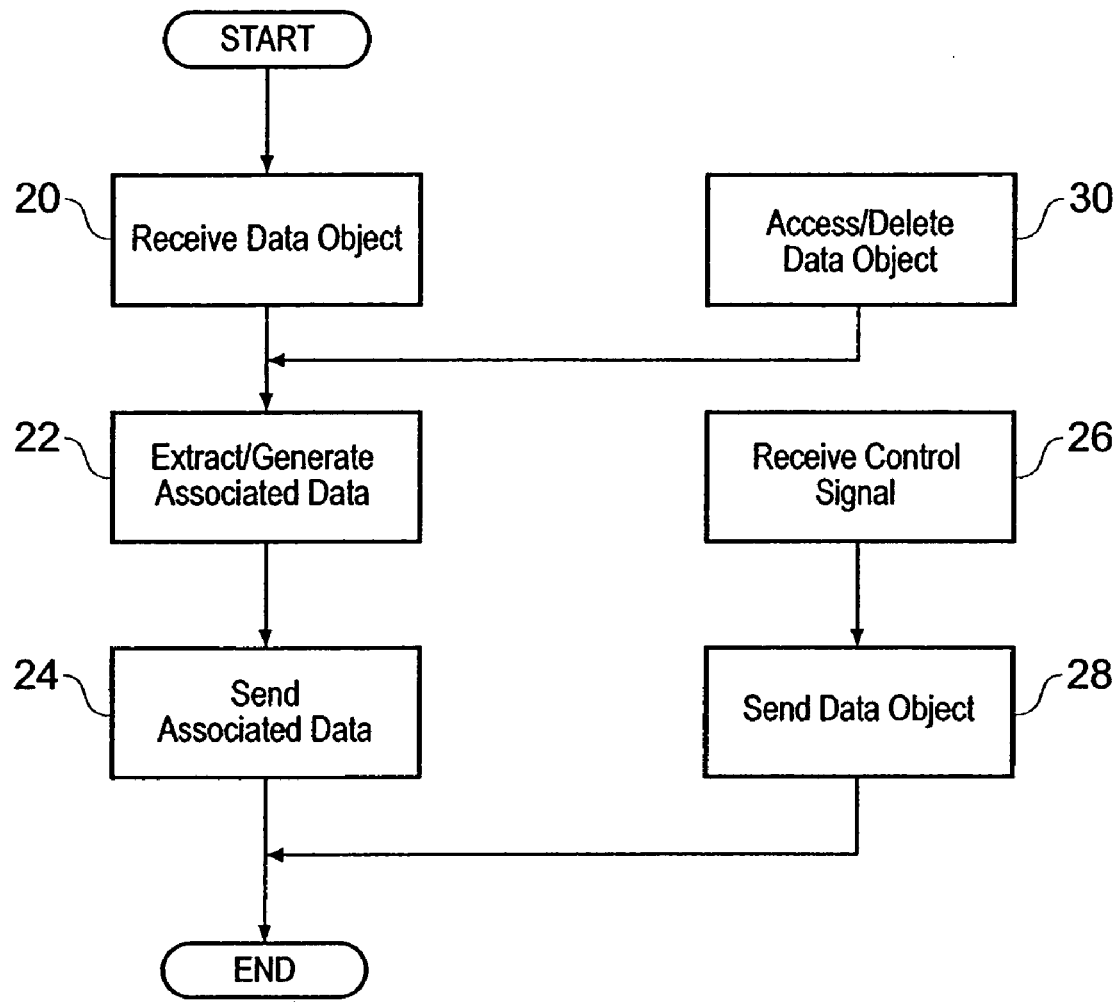
FIG. 3 is a flow diagram of a method of operation of a first data processing unit in accordance with embodiments of the present invention.

The operation of one of the data processing units 2 according to embodiments of the present invention is schematically illustrated in FIG. 3. An initial step 20 is the receipt of a data object from one of the other data processing units. This causes the data processing unit to extract or generate the appropriate associated data for that data object and to send the associated data to the data processing unit at which the data log is stored, as indicated by steps 22 and 24. The identity of the data processing unit at which the data log is stored may be already known or may be derived from the data object.

As previously mentioned, subsequent steps may include the receipt of a control signal that causes the data processing unit 2 to send an identified data object to a further data processing unit, as indicated in FIG. 3 by steps 26 and 28. Similarly, the accessing or deletion of a data object by the data processing unit, indicated at step 30, causes the appropriate associated data to be generated an sent to the data log, as described previously with reference to steps 22 and 24.

Figure 4:
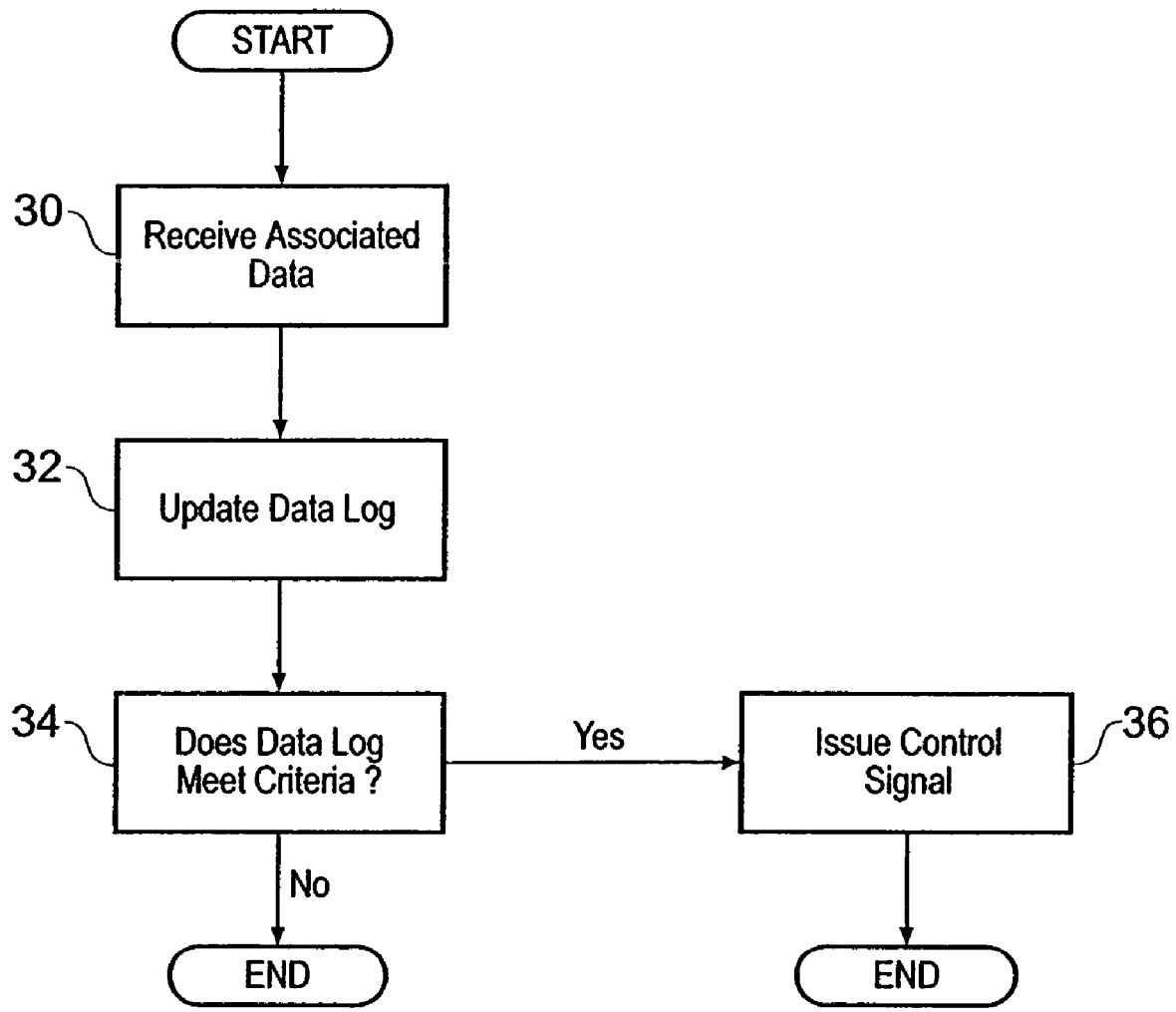
FIG. 4 is a flow diagram of a method of operation of a second data processing unit in accordance with embodiments of the present invention.

The operation of a data processing unit at which the data log is stored is schematically illustrated in FIG. 4. On receipt of associated data at step 30 the data log 8 is updated accordingly, shown as step 32. Preferably, a comparison is made between one or more of the data log entries and one or more predefined criteria, shown at step 34. If the criteria is met, for example the total number of copies of a data object stored on the system is below a particular number, a control signal is issued, step 36, that will cause the data object to be sent from one of the data processing units at which the data object is stored to a further data processing unit.

Figure 5:
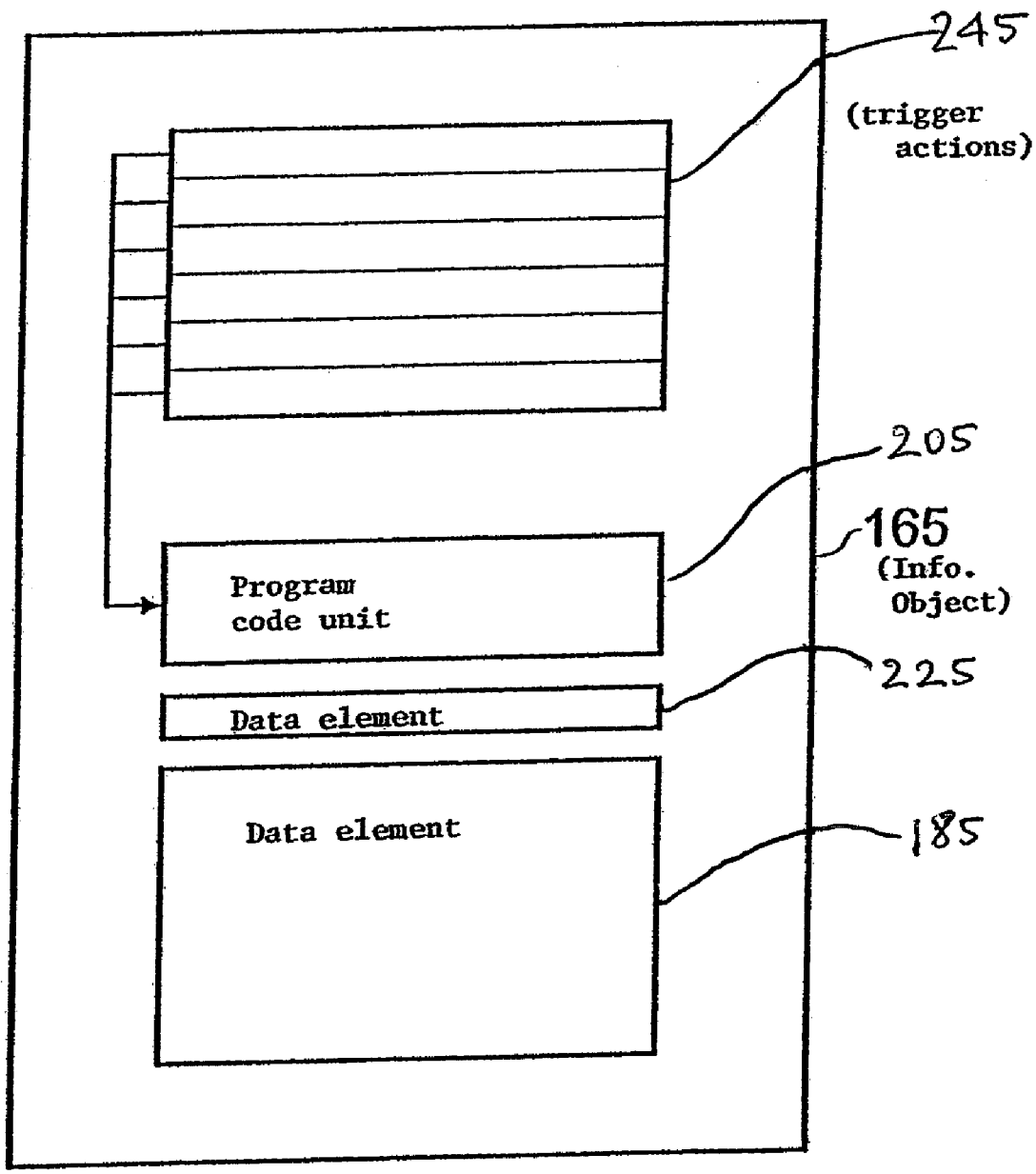
FIG. 5 is a schematic illustration of the composition of an information object communicated within the data management system of FIG. 2.

In preferred embodiments of the present invention, to achieve the desired automatic communication of data associated with an information object by the data processing units 2, each information object comprises both a data element and a program code unit, as schematically illustrated in FIG. 5. Each information object 165 includes a data element 185 that consists of the data accessed by a data processing unit when accessing the information object. In the case of the previous example of an audio file, the data element 185 would constitute an MP3 file, or the like, required for the data processing unit 2 to reproduce that audio file. Also included in the information object 165 is a program code unit 205. The program code unit is executable by the data processing unit 2 and causes the data processing unit to communicate data associated with the information object to the data log 8. The associated data may be included within the information object as a further data element 225, or may be generated by the data processing unit 2 at the time of execution of the program code unit 205, or some combination of the two. Also included within the information object 165 are one or more trigger actions 245. Each trigger action, which is preferably a predetermined action, causes the execution of the program code unit 205 by the data processing unit. Examples of trigger actions include the receipt at the data processing unit of an information object, the accessing of an information object by data processing unit and the deletion of an information object from a data processing unit, or more precisely the receipt of a command to delete the information object.

Figure 6:
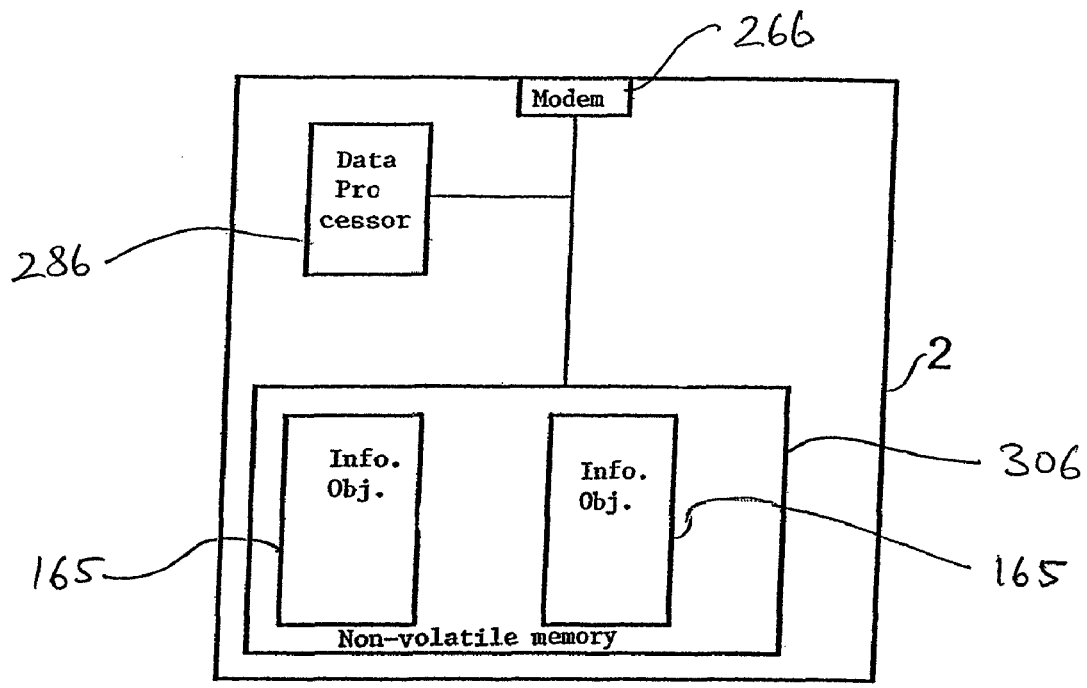
FIG. 6 is a block diagram of a first data processing unit according to an embodiment of the present invention.

An example of a data processing unit 2 suitable for use in embodiments of the present invention is schematically illustrated in FIG. 6. The data processing unit 2 includes communication means 266, for example a modem. This is connected to a data processor 286, which is in turn connected to a non-volatile memory 306, or data store. Stored within the non-volatile memory 306 are one or more information objects 165, each information object 165 being as described above with relation to FIG. 5. The receipt, or accessing, of an information object 165 by the data processing unit 2 causes the program code unit 205 within the information object to be executed by the data processor 286 of the data processor unit 2, which in turn causes the data associated with the information object to be communicated via the communication means 266 to the data log 8 within the data processing system.

Figure 7:
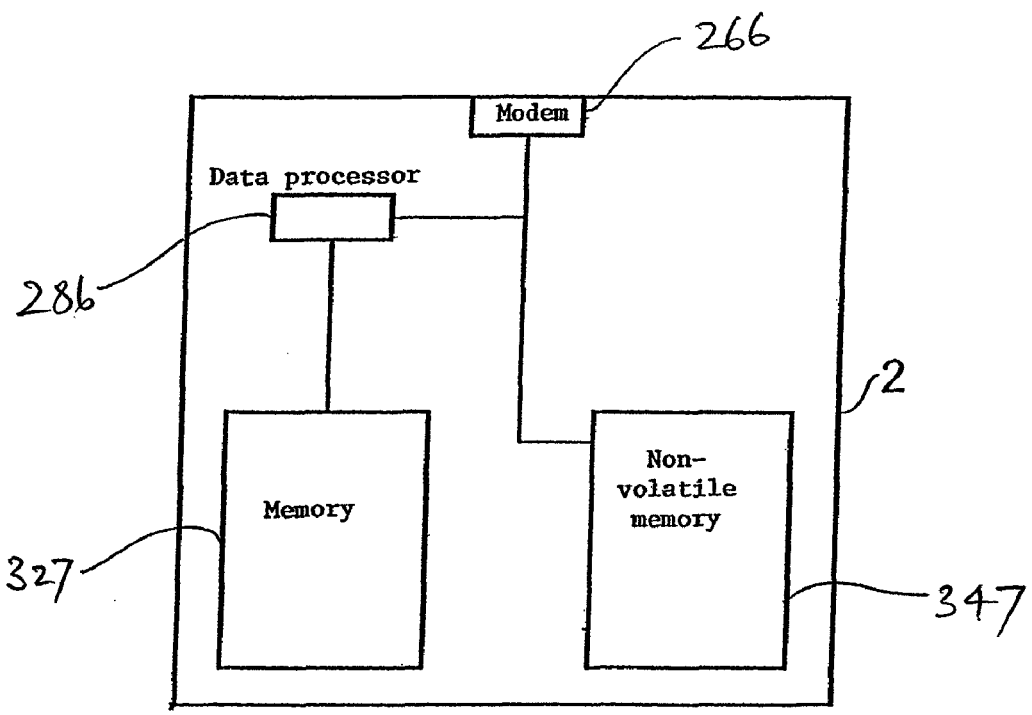
FIG. 7 is a block diagram of a second data processing unit according to an embodiment of the present invention.

A data processing unit 2 arranged to manage the data log in accordance with embodiments of the present invention is schematically illustrated in FIG. 7. As with the data processing unit 2 shown in FIG. 6, the data processing unit includes a communications device 266 connected to a processor 286. Also connected to the processor 286 and communications device 266 is a first non-volatile memory 347 in which the data associated with information objects communicated from the various data processing units 2 is stored. A second memory unit 327 is also provided and is connected to the processor 286. The second memory 327 stores the various criteria that may be applied in order to automatically manage the information objects within the data processing system, as described above.

Therefore, by providing a data management system in which data associated with information objects is automatically communicated to data management unit, it is possible to provide a data processing system in which the data management unit automatically controls the propagation and distribution of the information objects within the data processing system.

The invention claimed is:

1. A method of managing data within a distributed data storage system, the distributed data storage system comprising a plurality of data processing units connected with each other via a network, at least one of the data processing units having an information object stored thereon, the information object including a data element and an executable code unit, the executable code unit being arranged to automatically cause a data processing unit at which the information object is received to execute the code unit, the method comprising:

in response to receiving the information object, including the data element and the executable code unit, at a first one of the data processing units, automatically executing the received executable code unit by the first data processing unit;

execution of the received code unit causing the first data processing unit to send, via the network, data associated with the information object to a second data processing unit at which a data log is stored, the associated data identifying the received information object and the first data processing unit; and updating the data log by the second data processing unit in response to receiving the associated data at the second data processing unit, whereby other data processing units within the distributed data storage system that access the updated data log are aware of the availability of the information object at the first data processing unit.

2. A method according to claim 1, further comprising:
the first data processing unit sending, via the network, the associated data to the second data processing unit in response to the information object being accessed or deleted by the first data processing unit.

3. A method according to claim 1, further comprising:
in response to receiving a control signal at the first data processing unit, sending the information object from the first data processing unit to at least one further data processing unit within the distributed data storage system.

4. A method according to claim 1, wherein said data log comprises at least one of:
the total number of copies of the information object, to which the data is associated, stored within the distributed data storage system;
the elapsed time since the associated data was last sent to the second data processing unit;
the duration of each occurrence when the information object was accessed by a data processing unit; and
the number of times that the information object has been accessed by a data processing unit.

5. A method according to claim 1, further comprising:
in response to the data log conforming to at least one of a number of criteria, sending a control signal from the second data processing unit to the first data processing unit; and
the control signal, when received at the first data processing unit, causing the first data processing unit to send the information object to at least one further data processing unit within the distributed data storage system.

6. A method according claim 5, wherein said criteria comprise at least one of:
the total number of copies of the information object stored within the distributed data storage system being less than a predetermined value; and
the number of times that the information object has been accessed by a data processing unit being less than a predetermined value.

7. A method according to claim 1, further comprising:
sending a status request from the second data processing unit to the first data processing unit and, if no reply is received from the first data processing unit, updating the data log by the second data processing unit accordingly.

8. A method according to claim 1, wherein each of the data processing units within the distributed data storage system is arranged to perform one or more data management functions of the distributed data storage system.

9. A method according to claim 8, wherein the distributed data storage system comprises a peer-to-peer network.

10. A method according to claim 1, further comprising:
storing the received information object, including the data element and the executable code unit, in a memory of the first data processing unit for subsequent access, deletion or transmission of the stored information object to another one of the data processing units;
said updating comprising modifying the data log, by the second data processing unit, to indicate to other data processing units that the information object is currently available at the first data processing unit;
said data processing units comprising networked computers.

11. A method according to claim 1, further comprising:
the first data processing unit receiving, as part of the information object, a plurality of trigger actions associated with the executable code unit;
one of said trigger actions being a receipt trigger action which is triggered upon receipt of the information object at the first data processing unit to cause the execution of the executable code unit by the first data processing unit, and, hence, the transmission of the associate data to the second data processing unit.

12. A method according to claim 11, further comprising:
storing the received information object, including the data element, the executable code unit and the trigger actions, in a memory of the first data processing unit for subsequent access, deletion or transmission of the stored information objection to another one of the data processing units;
wherein
another one of the stored trigger actions is an access trigger action which is triggered upon access by the first data processing unit to the stored information object to cause re-execution of the executable code unit by the first data processing unit, and, hence, re-transmission of the associate data to the second data processing unit; and
a further one of the stored trigger actions is a deletion trigger action which is triggered upon the first data processing unit receiving a command to delete the stored information object, thereby causing re-execution of the executable code unit by the first data processing unit, and, hence, re-transmission of the associate data to the second data processing unit.

13. A method of managing data within a distributed data storage system, the distributed data storage system comprising a plurality of data processing units connected with each other via a network, at least one of the data processing units having an information object stored thereon, the information object including a data element and an executable code unit, the executable code unit being arranged to automatically cause a data processing unit at which the information object is received to execute the code unit, the method comprising:
in response to receiving the information object, including the data element and the executable code unit, at a first one of the data processing units, automatically executing the received executable code unit by the first data processing unit;
execution of the received code unit causing the first data processing unit to send, via the network, data associated with the information object to a second data processing unit at which a data log is stored, the associated data identifying the received information object and the first data processing unit;
in response to the information object being subsequently accessed or deleted, which actions cause the first data processing unit to re-execute the executable code unit, automatically resending, via the network, the associated data to the second data processing unit; and
updating the data log by the second data processing unit in response to receiving the associated data at the second data processing unit, whereby other data processing units within the distributed data storage system that access the updated data log are aware of the availability of the information object at the first data processing unit.

14. A method of managing data within a peer-to-peer network including a plurality of networked data processors, wherein
on receipt of an information object at one of the data processors, the data processor is automatically caused to execute a program code unit included in the received information object;
execution of the program code unit causes the data processor to send associated data relating to the received information object to a designated further one of the data processors at which a data log is located.

15. A data processing unit, comprising
a communication unit for communicating, via a network, to at least one further data processing unit; and
a processor being arranged in response to receiving an information object, including a data content unit and an executable program code unit, via the communication unit to automatically execute the received program code unit, whereby the data processing unit is caused to automatically send data associated with the received information object to the further data processing unit;
wherein the associated data identifies the received information object and the data processing unit at which the information object was received.

16. A data processing unit according to claim 15, wherein the processor is arranged to re-execute the program code unit and resend the associated data to the further data processing unit in response to one or more of: accessing the information object by the data processing unit; and
deleting the information object by the data processing unit.

17. A data processing unit according to claim 15, being a computer and further comprising:
a memory storing therein the received information object, including the data content unit and the executable program code unit;
said memory further storing therein at least a trigger action associated with the executable program code unit, said trigger action being triggered when the stored information object is accessed or deleted to cause re-execution of the executable program code unit by the processor and, hence, re-transmission of the associate data to the further data processing unit.

18. A data processing unit according to claim 17, wherein said processor is further arranged, in response to receiving
a control signal from the network, to send the stored information object, including the data content unit and the executable program code unit, together with the trigger action associated with the executable program code unit, to a designated further data processing unit on the network.

19. A data processing unit according to claim 18, wherein said memory further stores therein the associate data; and
said processor is further arranged, in response to receiving the control signal from the network, to send the stored information object, including the data content unit and the executable program code unit, together with the trigger action associated with the executable program code unit and the stored data associated with the data content unit, to the designated further data processing unit on the network.

* * * * *